L. McKINNON.
TIRE.
APPLICATION FILED MAY 26, 1916.

1,226,899.

Patented May 22, 1917.
2 SHEETS—SHEET 1.

Lemuel McKinnon,
Inventor

Witnesses by C. A. Snow & Co.
Attorneys

L. McKINNON.
TIRE.
APPLICATION FILED MAY 26, 1916.
1,226,899.
Patented May 22, 1917.
2 SHEETS—SHEET 2.
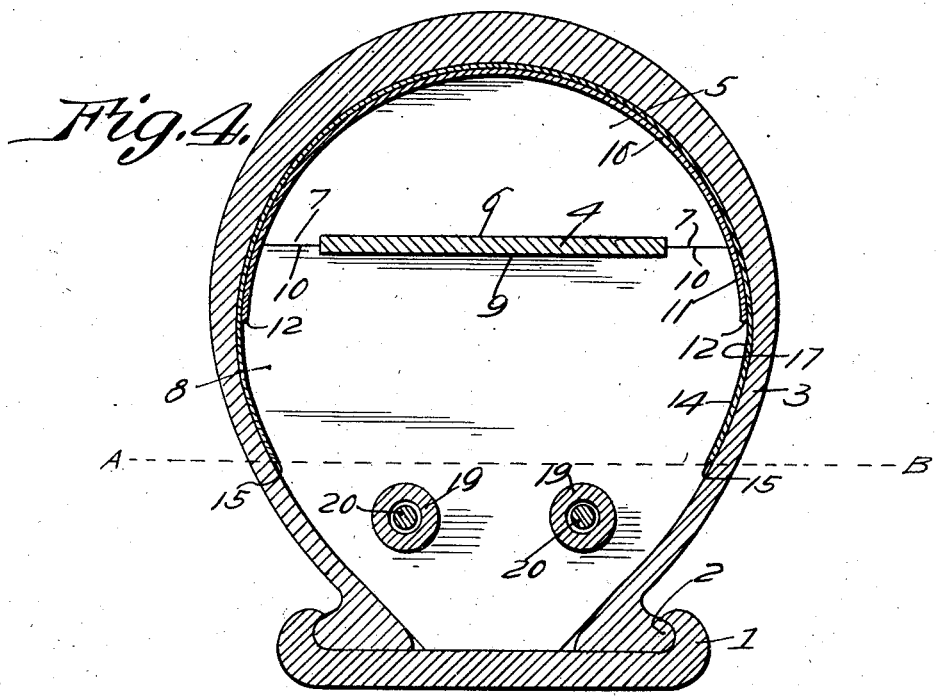
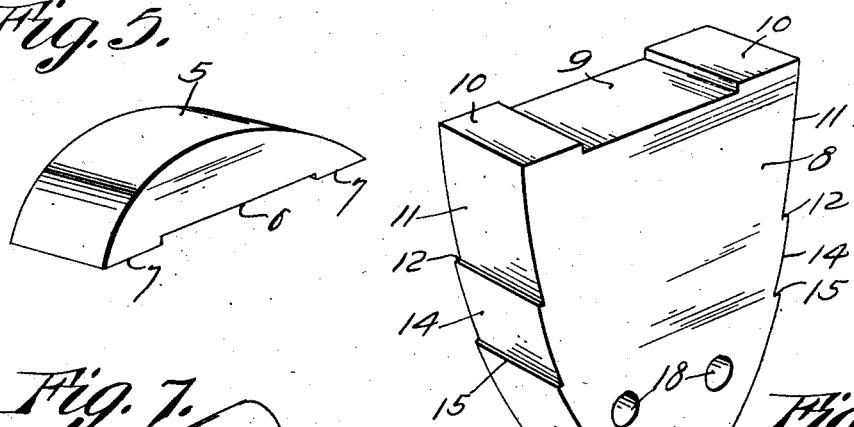
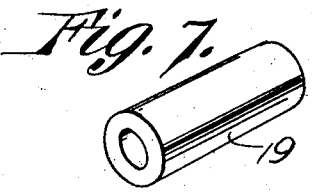
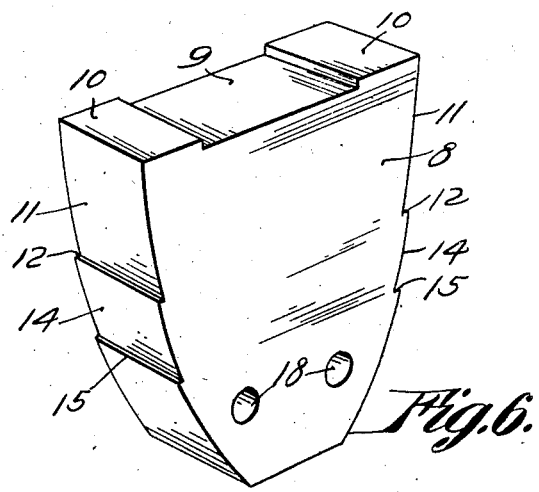
Lemuel McKinnon,
Inventor
Witnesses
by
Attorneys

UNITED STATES PATENT OFFICE.

LEMUEL McKINNON, OF SALT LAKE CITY, UTAH.

TIRE.

1,226,899.	Specification of Letters Patent.	Patented May 22, 1917.

Application filed May 26, 1916. Serial No. 100,067.

*To all whom it may concern:*

Be it known that I, LEMUEL McKINNON, a citizen of the United States, residing at Salt Lake City, in the county of Salt Lake and State of Utah, have invented a new and useful Tire, of which the following is a specification.

The device forming the subject matter of this application is a tire, and one object of the invention is to provide a novel form of filler for a tire casing, the construction being such that inflatable tubes and like elements subject to puncture and deterioration may be dispensed with.

A further object of the invention is to provide a tire filler which may be fashioned readily, the filler being so constructed that it will afford the desired resiliency in a vertical direction, without being unstable in a direction transverse to the median plane of the wheel.

Another object of the invention is to provide novel means for holding spaced, certain of the constituent blocks, a tightening means for the filler being made efficient for retaining the spacers whereby said blocks are held apart.

Another object of the invention is to provide a novel form of tightening means for the tire.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Fig. 4 is a transverse section taken approximately on the line 4—4 of Fig. 1;

Fig. 5 is a fragmental perspective showing one of the outer blocks of the filler;

Fig. 6 is a perspective showing one of the inner blocks of the filler; and

Fig. 7 is a perspective showing one of the spacers whereby the blocks of Fig. 6 are held apart.

Figure 1:
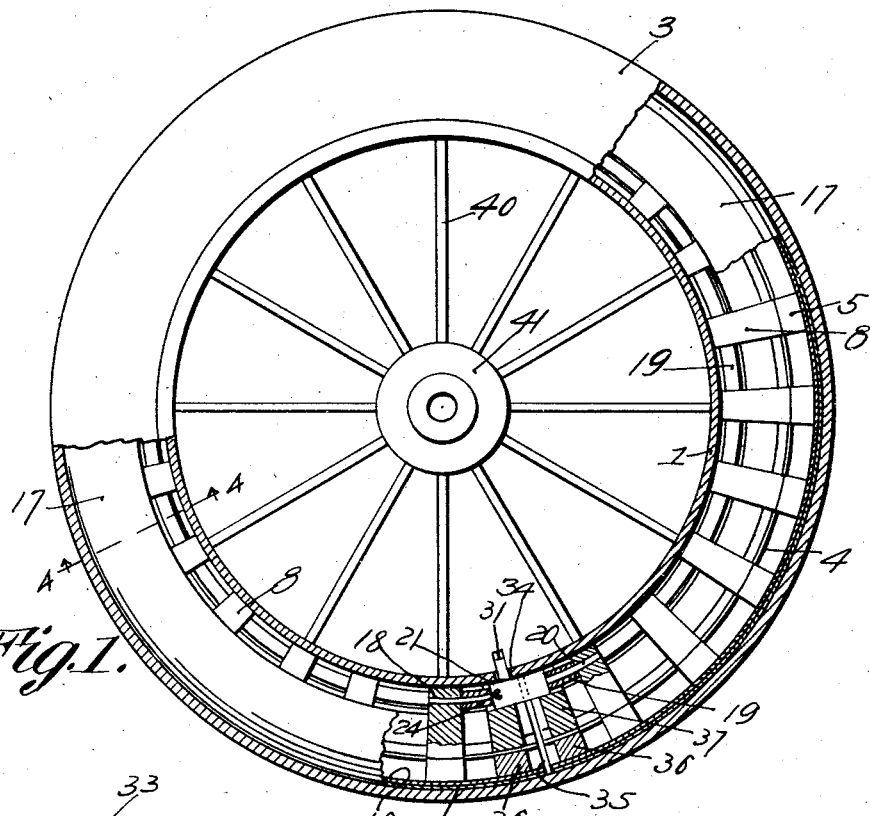
Figure 1 shows in side elevation, a wheel equipped with the tire forming the subject matter of this application, parts being broken away.

In the accompanying drawings, the numeral 1 indicates the rim of a vehicle wheel supported on spokes 40 radiating from a hub 41. Connected in any desired manner with the rim 1, as indicated at 2, is a tire casing 3.

Disposed within the tire casing 3 is a filler which constitutes a part of the novel portion of the present invention. The filler includes a circumferential strip 4 which may be made out of canvas, textile material of any sort, wood or any other suitable substance having some resiliency and flexibility. Disposed between the strip 4 and the tread portion of the casing 3 are outer blocks 5, spaced circumferentially of the tire. The blocks 5 may be made of rubber or a rubber compound. The blocks 5 are curved upon their outer edges, to conform to the transverse curvature of the casing 3, but upon their inner edges, the blocks 5 preferably are flat, all of which is clearly disclosed in Fig. 5. In the inner edges of the outer blocks 5, notches 6 are formed, and it is in these notches 6 that the circumferential strip 4 is received. The notches 6 define inwardly projecting lugs 7 at the lateral ends of the blocks 5. Alined radially of the tire with the outer blocks 5 are inner blocks 8, the blocks 8 being located on the opposite side of the strip 4 from the blocks 5. The inner blocks 8, like the blocks 5, preferably are made of rubber, a rubber compound, or some other resilient material. In the outer edges of the inner blocks 8, notches 9 are formed, the notches 9 being complemental to the notches 6, and coöperating therewith to receive the strip 4. The notches 9 define lugs 10, abutting against and coöperating with the lugs 7 of the outer blocks 5. The lugs 7 and 10 are vulcanized or cemented together, and the strip 4, being received with the opening defined by the notches 6 and the notches 9, is vulcanized or secured otherwise to the blocks 5 and 8 within the contour of the notches 6 and 9. The blocks 8 are of roughly cardioid form, so as to coöperate properly with the side portions of the casing 3. In the lateral edges of the inner blocks 8, superficial recesses 11 are formed, the same defining shoulders 12. Disposed between the shoulders 12 and the rim 1 and fashioned in the lateral edges of the inner blocks 8, are recesses 14 defining shoulders 15.

An inner cover strip 16, made of canvas or any other flexible material, extends across the curved tread edges of the outer blocks 5 and extends down onto the lateral edges of the inner blocks 8, the edges of the cover strip 16 being received in the recesses 11 and abutting against the shoulders 12. The inner cover strip 16 is secured by vulcanizing, cementing, or in any other suitable manner, to the blocks 5, and to the blocks 8 within the contour of the recesses 11. Superposed on the inner cover strip 16 and secured thereto by vulcanizing, cementing or otherwise, is an outer cover strip 17 which may be made of textile material or any other suitable substance. The edges of the outer cover strip 17 project beyond the edges of the inner cover strip 16 and are received in the recesses 14 of the inner blocks 8, the extreme edges of the outer cover strip 17 abutting against the shoulders 15. The inner cover strip 16 is secured not only to the outer cover strip 17, but is secured, as well, to the inner blocks 8, within the recesses 11. From the description as thus far proceeded with, it will be obvious that the strip 4 and the strips 16 and 17 coöperate to hold the outer portions of the blocks 8 and 5 spaced from each other, circumferentially of the tire.

In the blocks 8 are formed openings 18 extended circumferentially of the tire. Interposed between the blocks 8 and extended circumferentially of the tire are tubular spacers 19, one of which is shown in Fig. 7. The spacers 19, if desired, may be made of metal. The axes of the spacers 19 are alined with the axes of the openings 18, the spacers abutting terminally against the adjacent faces of the inner blocks 8, to stiffen and sustain the filler relatively near to the rim 1.

Figure 2:
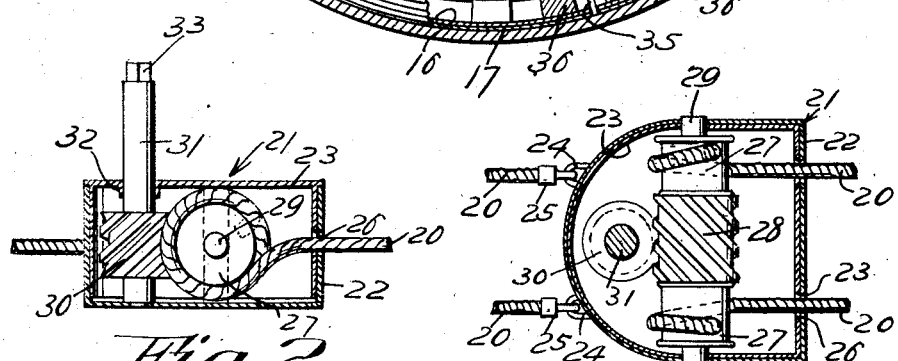
Figs. 2 and 3 are sectional views of the tightening means.
Figure 3:
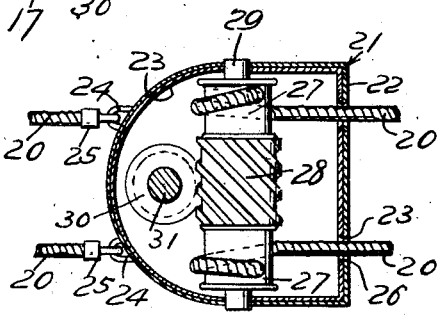

A tightening means for the filler above described is provided, and the same preferably includes a pair of parallel flexible elements 20 extended circumferentially of the filler. The flexible elements 20 may be cables, made either of wire or some vegetable material. The tightening means includes a box-like casing 21 including a body 22 and a cover 23 adapted to be telescoped within the body, as indicated in Fig. 2. The casing preferably is made of metal. The body portion 22 of the casing is provided with eyes 24 to which the flexible elements 20 are connected at one end, as shown at 25. The flexible elements pass through the openings 18 in the inner blocks 8 of the filler and pass also through the spacers 19. It will be observed, therefore, that the flexible elements 20 serve not only to tighten down the filler on the rim, but serve, as well, as a means for supporting the spacers 19 between the blocks 8. The opposite ends of the flexible elements 20 pass through openings 26 formed in the body 22 and in the cover 23 of the casing 21. The said ends of the flexible elements 20 are engaged around and secured to drums 27, located within the casing 21. Disposed between the drums 27 is a worm wheel 28. The worm wheel 28 and the drums 27 are secured to a shaft 29, journaled terminally in the casing 21. If desired, the worm wheel 28, the drums 27 and the shaft 29 may be fashioned in one piece. Disposed transversely of the worm wheel 28 and coacting therewith is a worm 30 carried by a shaft 31 journaled in the casing 21, the cover 23 preferably being provided with an inwardly projecting bearing 32 in which the shaft 31 is received. The shaft 31 is provided with a squared end 33 so that the shaft may be rotated readily by means of a wrench or key. The shaft 31 projects through an opening 34 formed in the rim 1.

The filler is divided as shown at 35, to form separate ends. At the ends of the filler are located outer blocks 36 of the kind hereinbefore described and designated by the reference character 5 in Fig. 5. The terminal inner blocks are denoted by the numeral 37 and are like the blocks 8, the blocks 37 being formed by cutting off the blocks 8 approximately along the line A—B of Fig. 4, so as to make room for the casing 21, a point which will be understood readily when Fig. 1 of the drawings is noted. The ends of the strip 4 are connected with the terminal blocks 36 and 37.

In practical operation, the shaft 31 may be rotated by applying a wrench or key to the squared end 33 of the shaft. When the shaft 31 is rotated, the worm 30 carried by the shaft rotates the worm wheel 28 and the drums 27 are rotated, the extremities of the flexible elements 20 being wound about the drums, and the filler in this manner being held securely on the rim 1.

Especial attention is directed to the general makeup of the filler, as disclosed in Figs. 4, 5 and 6. The filler comprises a plurality of spaced disks comprising the blocks 8 and 5, and these disks are held in spaced relation not only by the strip 4, but, as well, by the spacers 19, the same being held in place by a portion of the tightening means, to wit, the flexible elements 20. Owing to the fact that the blocks 8 and 5 are constructed as shown in Figs. 6 and 5, the blocks may be assembled readily with the strip 4 and may be connected to each other and to the strip.

Having thus described the invention, what is claimed is:—

A tire filler comprising a circumscribing strip; and resilient disks through which the strip passes, the disks comprising outer blocks and inner blocks alined radially with the outer blocks, the outer blocks being provided on their inner edges with notches defining lugs and the inner blocks being provided upon their outer edges with notches defining lugs, the notches in the blocks coöperating to form an opening in which the strip is received and secured, the lugs of the inner and outer blocks abutting against each other and being secured together, beyond the lateral edges of the strip.

In testimony that I claim the foregoing as my own, I have hereto affixed my signature in the presence of two witnesses.

LEMUEL McKINNON.

Witnesses:
M. E. RAWSON,
E. L. VAN METER.